United States Patent [19]

Glauert et al.

[11] 4,166,977

[45] Sep. 4, 1979

[54] ROTARY SPEED AND ANGULAR POSITION DETERMINATION SYSTEM, PARTICULARLY FOR THE CRANKSHAFT OF AN INTERNAL COMBUSTION ENGINE

[75] Inventors: Wolfram Glauert, Bamberg; Helmut Klinger, Münchingen, both of Fed. Rep. of Germany

[73] Assignee: Robert Bosch GmbH, Stuttgart, Fed. Rep. of Germany

[21] Appl. No.: 823,736

[22] Filed: Aug. 11, 1977

[30] Foreign Application Priority Data

Sep. 16, 1976 [DE] Fed. Rep. of Germany ....... 2641592

[51] Int. Cl.[2] .......... G01P 3/66

[52] U.S. Cl. .......... 324/173; 324/174; 324/208

[58] Field of Search .......... 324/173, 174, 16 T, 324/208; 340/347 P, 671; 123/117 D

[56] References Cited

U.S. PATENT DOCUMENTS

| | | | |
|---|---|---|---|
| 3,652,832 | 3/1972 | Baumann | 324/16 T |
| 3,846,697 | 11/1974 | Cila et al. | 324/174 |
| 4,001,687 | 1/1977 | Sorkin et al. | 324/173 |
| 4,068,631 | 1/1978 | Lombard et al. | 123/117 D |
| 4,072,893 | 2/1978 | Huwyler | 340/671 |

FOREIGN PATENT DOCUMENTS

| | | | |
|---|---|---|---|
| 602894 | 3/1960 | Italy | 324/208 |
| 885617 | 12/1961 | United Kingdom | 324/174 |
| 963595 | 7/1964 | United Kingdom | 324/208 |

OTHER PUBLICATIONS

Wroblewski, E. J.; Hall Effect Impulse Emitter; IBM Tech. Bull.; vol. 14, No. 12, May 1972. p. 3810.

Flaherty et al., Magnet Configuration for Hall Sensor Etc.; IBM Tech. Bull.; vol. 15, No. 4, Sep. 1972; p. 1254.

*Primary Examiner*—Robert J. Corcoran

*Attorney, Agent, or Firm*—Frishauf, Holtz, Goodman & Woodward

[57] ABSTRACT

A star wheel, typically the starter gear of an internal combustion engine is magnetically coupled to a stationary pickup, for example a coil-core or yoke combination, a Hall generator, or the like. Upon rotation of the gear, or star wheel, sequential signals will be induced in the pickup which, related to time, provide an output signal representative of speed. To determine an angular reference position, an additional magnetically responsive reference element is included in the magnetic circuit formed by the stationary pickup and the teeth of the star wheel, to additionally modify the reluctance of the pickup-star wheel magnetic circuit, and change the characteristic of the output signal, for example by a phase jump, a discrete output level jump, or the like. The reference element may be a pin of soft iron, or of the material having soft iron characteristics, a pre-magnetized pin, or the like, exposed to the yoke arms of a pickup surrounding the star wheel, or otherwise magnetically coupled to the pickup.

13 Claims, 4 Drawing Figures

13
12
10'
15
14
11
10

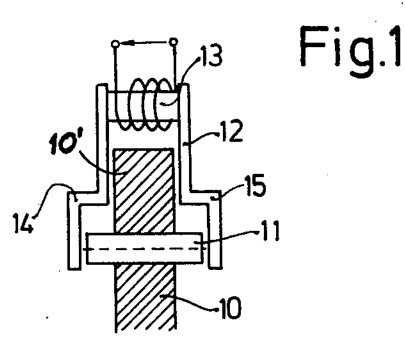
Fig.1
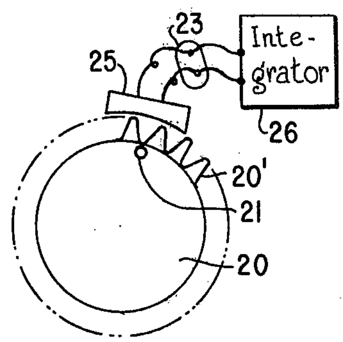
Fig.1a
Fig.2
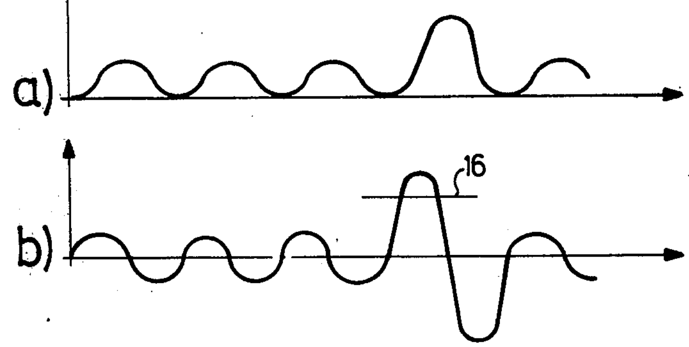
Fig.3
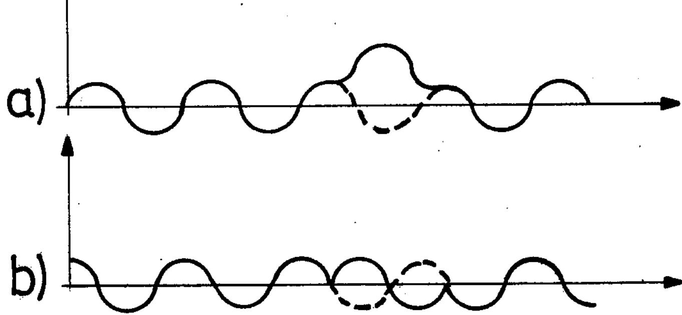

ROTARY SPEED AND ANGULAR POSITION DETERMINATION SYSTEM, PARTICULARLY FOR THE CRANKSHAFT OF AN INTERNAL COMBUSTION ENGINE

Cross reference to a related patent assigned to the assignee of the present application and to the literature:

J. Marcus, Sourcebook of electronic circuits 1968, McGraw Hill Book Company S. 306 ff.

U.S. Ser. No. 604,228 filed Aug. 13, 1975, now U.S. Pat. No. 4,095,179, Bremer et al.

The present invention relates to apparatus to recognize the angular position of a shaft and additionally to obtain output signals from the apparatus representative of speed of rotation of the shaft.

BACKGROUND AND PRIOR ART

It has previously been proposed to determine the speed of rotation of a shaft by placing a magnetic transducer element in magnetically coupled relation with a star wheel, or toothed disk. A typical application is the determination of the speed of rotation of an internal combustion engine, and especially of an automotive type internal combustion engine. The transducer can be located in magnetically coupled relationship to the main starter gear, connected to the flywheel of the internal combustion (IC) engine. The magnetic pickup, typically, is a coil, or a core on which a coil is wound which is so placed that as the teeth of the gear, or of the star wheel pass the core of the pickup, the magnetic reluctance of the magnetic circuit of which the pickup is a part changes, thus providing changing output signals. The speed of rotation of this shaft is then determined by relating the output signals to a time reference. If it is additionally desired to obtain a reference signal representative of a particular angular position of the shaft which, in an IC engine would correspond to a specific angular position of a piston in the engine, then it has been customary to provide a second disk, or ring cooperating with a second pickup coil. It is frequently difficult to locate a second rotating element on the shaft and to place a second pickup unit. Additionally, the star wheel, typically the starter gear, and the second or reference element rotating therewith must be accurately angularly positioned so that the signals derived from the respective pickups will be coordinate. The provision of a second rotating disk and pickup is expensive and requires additional installation cost, if space considerations permit its use.

SUBJECT OF THE PRESENT INVENTION

It is an object of the present invention to provide an apparatus and system in which a single rotating element only is required, coupled to the shaft whose angular position is to be determined, and the arrangement is so made that the single rotating element provides output signals which can discretely determine both speed of the disk as well as a predetermined angular position.

Briefly, the star wheel, typically the starter gear of an automotive type IC engine additionally includes a reference element which is used to characterize a specific angular position of the shaft. The reference element is so placed that it will also be included in the magnetic circuit of the stationary pickup element which is magnetically coupled to the star points, or gear teeth of the star wheel, or gear. The additional reference elements, by changing the magnetic reluctance, or magnetic relationship of the magnetic circuit of the pickup element provides for an additional change of the magnetic flux and thus an additional change in the signal picked up by the pickup coil. The pickup coil, customarily, is located to sense passage of the teeth of the star wheel, or gear, the teeth changing the magnetic reluctance within a loop of constant magnetic force, thereby changing the flux relationship of the magnetic flux passing through the pickup coil.

The arrangement in accordance with the present invention has the advantage that only a single pickup element is needed to determine both speed of the rotating shaft as well as to sense a predetermined angular reference position thereof. It is only necessary to slightly modify the star wheel, or starter gear, for example, by applying a reference element thereon. Such an arrangement is simple an inexpensive and assembly of the components in an automotive vehicle is simple.

Drawings, illustrating an example:

FIG. 1 is a fragmentary vertical schematic view through the pickup element in relation to a tooth of the starter gear of an automotive IC engine, and additionally supplied with a reference element;

FIG. **1*a* is a highly schematic end view of the starter gear, to a substantial reduced scale with respect to FIG. 1**, showing the pickup in relation to the starter gear, with the forward portion of the pickup removed, or broken away to illustrate the relative position of the elements;

FIG. 2 is a graph of magnetic flux and the voltage induced as a result thereof;

FIG. 3 in two graphs, a, b, shows flux and output voltage if the reference element is positioned on a radial line located between respectively adjacent teeth of a gear.

The starter gear 10 (FIG. 1) of an IC engine has a reference element 11 secured thereto. The starter gear, as well as the reference element 11 are externally surrounded by a yoke 12, forming the core of an induction coil 13. The yoke 12 and coil 13 form a stationary pickup element. The yoke 12 is formed with two arms 14, 15. In dependence on the position of the gear 10 with respect to the arms 14, 15, that is, whether a tooth 10' is between the yoke, or whether a tooth gap is between the yoke, the magnetic resistance of the magnetic circuit formed by the yoke 12 and the gear 10 will be high, or low. The resulting change in flux induces a voltage in the coil 13 which then indicates that a tooth is passing the pickup. These signals can be used to determine speed of a rotating shaft, for example the crankshaft speed of an IC engine. The reference element 11 on the gear 10 is made of a magnetically highly conductive material, such as a soft iron, or soft iron-like material. It is positioned radially outwardly as far as possible and is located on a radius leading to the center of a gear tooth 10'. The reference element 11 is in the form of a pin, the ends of which extend beyond the end surfaces of the gear 10. When the reference element 11 passes the pickup, the end surfaces of the pin 11 formed thereby and the arms 14, 15 of the yoke 12 will be facing each other.

Rather than using a pin of magnetic highly conductive material, a permanent magnet can be inserted in the gear 10 which additively increases the magnetic force of the magnetic circuit which includes the coil 13. The specific shape of the arms 14, 15 of the yoke results in a decreased magnetic resistance beyond that caused by the presence of a tooth itself. The reference element 11, in effect, provides a low magnetic reluctance path in parallel to the magnetic reluctance path provided by a gear tooth itself. The resulting change in flux will then be substantially higher than the change in flux caused merely by the passage of the tooth. The presence of the magnetic element can thereby be sensed by sensing the excess increase of induced voltage.

The reference element can also be located in a gap between teeth as shown in FIG. 1*a*. The reference element 21 is located in a gap between adjacent teeth 20' of star wheel 20. The reference element thus will provide a low magnetic resistance, when it passes the pickup, in parallel to the relatively high magnetic resistance caused by the gap between teeth. The magnetic resistance of the reference element 21 will be much less than that of a tooth alone. The sudden increase in magnetic flux causes two subsequent phase jumps or phase shifts of the voltage induced in the coil 13. This sudden change in phase can be used as the recognition signal to determine the reference position of the rotating shaft with which the reference element is associated.

FIG. 2, in graph a , shows the basic oscillation curve of magnetic flux as gear teeth 10' pass the pickup 12, 13. Where the reference element 11 passes, a substantial increase in amplitude of the magnetic flux is clearly visible. FIG. 2*b* illustrates the voltage induced in the coil 13 due to the change in magnetic flux upon rotation of disk or gear 10. The time axis, that is, the x-axis illustrated in graph b of FIG. 2 can be used as a threshold level at which a speed signal is triggered, that is, the null level of the positive signal, for example, in graph b of FIG. 2 can be used to trigger speed pulses. Line 16 of graph b of FIG. 2 illustrates a second threshold level which can be used to recognize the reference signal derived from the reference element 11.

FIG. 3 illustrates the respective relationships of magnetic flux and induced voltage with respect to the embodiment illustrated in FIG. 1*a* and in which the reference element is located in the gap between teeth. The reference element is a permanent magnet. Use of a reference element 21 formed as a permanent magnet permits positioning the permanent magnet in such a manner that it does not project beyond the axial end faces of the disk, or gear 10; it may also merely represent a permanently magnetized location. The form of the output voltage, absent the magnetic element is shown in FIG. 3 in solid line and partly in broken line. Where the magnet element is located, an excess amount of flux will be produced in the magnetic circuit formed by the yoke 12 and its arms 14, 15 coupled to the element 21. The graph of FIG. 3*b* shows the resulting shift in phase of the output signal in solid lines which will be obtained. The broken line signal is drawn in for purposes of comparison. As is clearly apparent, the output at the location of the reference element 11, 21, respectively, produces a phase shift of 180°.

The signals derived from coil 13 (FIG. 1) or the pickup 25 (FIG. 1*a*), shown only in general form in FIG. 1*a* can be evaluated is well known. In the first approximation, the peak values of the induced voltage are roughly proportional to speed of the disk 10. This speed dependency can be removed, as known, by integration of the induced voltage, with respect to time. After integration, a signal is obtained having peak values which are only little dependent on speed. The integrator can be constructed as a compensated integrator, so that even the slight dependency on rotational speed can be compensated in the integrating circuit schematically shown at 26 in FIG. 1*a*.

Various changes and modifications may be made; for example, the pickup 25 need not be a coil element as shown at 13 in FIG. 1, but change in magnetic flux can be sensed directly, for example, by magnetic field dependent sensors, such as Hall generators, field responsive diodes, field responsive chips, or the like.

Features described in connection with any one of the embodiments may be used with any of the other, within the scope of the invention concept.

We claim:

1. Combined rotary speed and angular position determination system, to determined the angular speed and the instantaneous angular position of a reference point of a rotating shaft, to provide both a speed signal and a reference signal representative, respectively, of the speed of the shaft and the predetermined angular position of the shaft, comprising the combination of a star wheel (10, 20) having a toothed circumference;

at least one reference element (11, 21) located on the star wheel and placed thereon at a predetermined angular position with respect to said reference point including a pin (11, 12) extending transversely through the wheel and parallel to the axis thereof;

a stationary electromagnetic pickup having a magnetic yoke (12, 14, 15) located in magnetically coupled relationship both with respect to the toothed circumference of the star wheel and the location of said reference element on the star wheel when the reference element and the yoke are in angular alignment, the core or yoke being formed with extending arms (14, 15) reaching around the toothed edge portion of the wheel (10) and extending to face the end portions of the reference element pin (11) when the reference element is in a position opposite the pick-up, the teeth and gaps of the star wheel and the yoke of the pick-up forming a first magnetic circuit, the reference element and the yoke of the pickup forming a second magnetic circuit, whereby the yoke will be common to both said magnetic circuits;

and means (13) deriving an electrical output signal from the yoke (12, 14 15) of said pick-up representative of the change in the magnetic reluctance of both said magnetic circuits to provide said speed signal as the first magnetic circuit changes its magnetic reluctance cyclically upon rotation of the shaft, thereby causing cyclical flux changes and having an additional characteristic representative of the additional change in the reluctance introduced by the second magnetic circuit upon passage of the reference element (11, 21) past the yoke of said pick-up and to provide said reference signal.

2. System according to claim 1, wherein the means deriving the electrical output signal comprises a coil (13) and the pickup is a coil-core combination.

3. System according to claim 1, wherein the means deriving the electrical output signal includes a solid state magnetically field-responsive element.

4. System according to claim 1, wherein the means deriving the electrical output signal comprises a Hall generator.

5. System according to claim 1, wherein the means deriving the electrical output signal comprises a magnetic field sensor plate.

6. System according to claim 1, wherein the reference element (11) is located on a radial line passing through the center of a tooth and the center of the wheel (10).

7. System according to claim 1, wherein the reference element (21) is located on a radial line passing through the center of the gap between adjacent teeth and the center of the star wheel (20).

8. System according to claim 1, wherein the reference element (11, 21) comprises a material having, magnetically highly conductive characteristics.

9. System according to claim 1, wherein the pin extends beyond the end faces of the wheel.

10. System according to claim 8, wherein the material has soft iron characteristics.

11. System according to claim 1 wherein the reference element comprises a permanently magnetized pin.

12. System according to claim 1, wherein the means deriving the electrical output signal includes an integrator circuit (26).

13. System to determine the rotary speed and an instantaneous angular position of an internal combustion engine, the crankshaft being coupled to a starter gear, comprising the system of claim 1 wherein the starter gear forms said star wheel (10, 20), the gear teeth (10', 20') defining said toothed circumference.

* * * * *